June 10, 1947.  M. GIORDANO  2,421,751
COLLAPSIBLE SHOPPING CART
Filed July 25, 1944
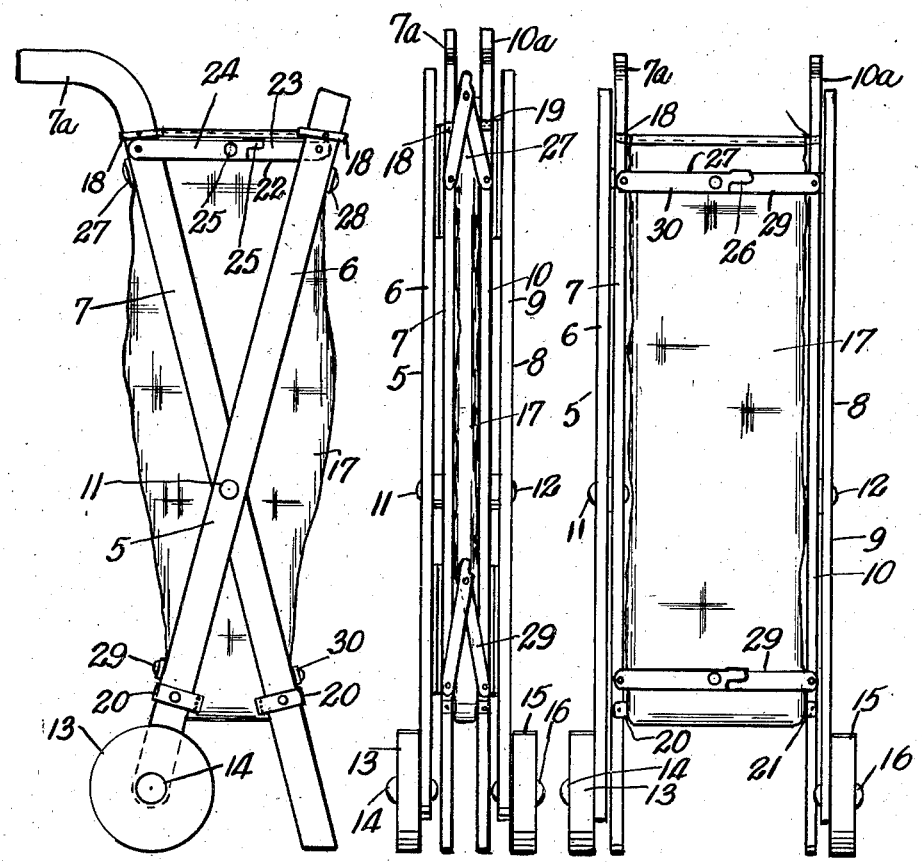
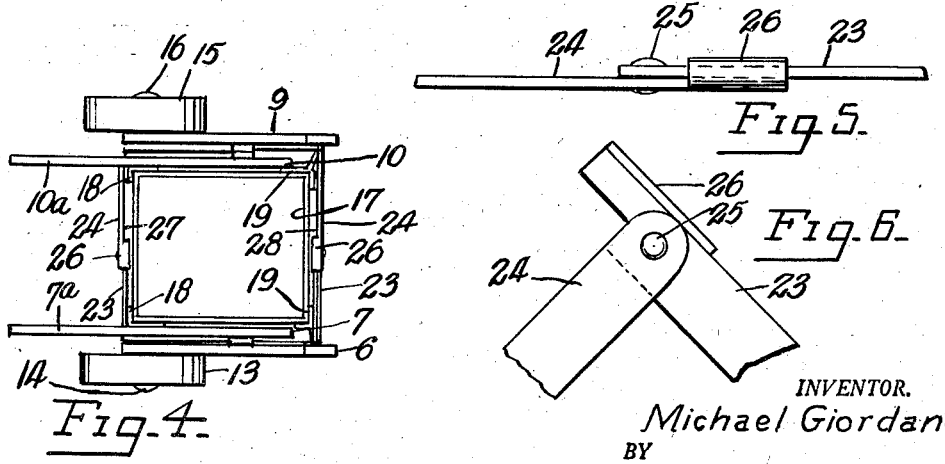
INVENTOR.
Michael Giordano
BY
Carl Miller
ATTORNEY

Patented June 10, 1947

2,421,751

UNITED STATES PATENT OFFICE 2,421,751

COLLAPSIBLE SHOPPING CART

Michael Giordano, Brooklyn, N. Y.

Application July 25, 1944, Serial No. 546,456

3 Claims. (Cl. 280—41)

This invention relates to a rollable collapsible shopping bag, and one of its objects is to provide a frame consisting of companion pivoted side members or bars, with means for allowing these side members to fold toward each other, which will serve to sustain the members in open position, and further to provide a collapsible shopping bag which is supported by the side members.

Another object of the invention is to provide a device consisting of companion folding side frames, each frame consisting of pivoted bars, at least one of which is provided with a ground wheel, a fabric bag supported between the two frames and adapted to be collapsed with the frames, and means for bracing the frames in open position, which are constructed to permit the frames to be easily collapsed against the shopping bag.

With the above and other objects in view the invention consists in certain new and useful constructions, combinations and arrangements of parts, clearly described in the following specification, and fully illustrated in the drawings, in which:

Fig. 1 is a side view, showing the frames extended and the shopping bag in open position.

Fig. 2 is a side elevation, showing both side frames in extended open position.

Fig. 3 is a similar view, but showing the side frames collapsed.

Fig. 4 is a top plan view, showing the side frames in open position.

Fig. 5 is a detail plan view of a brace joint, showing the brace members in open extended position.

Fig. 6 is a detail side view thereof, showing the brace members partly folded on each other.

Referring to the accompanying drawings illustrating the practical application of my invention, 5 designates one of the folding side frames, which consists of the companion side bars 6 and 7, and 8 designates the other folding side frame, which consists of the companion side bars 9 and 10.

The two side bars 6 and 7 of the frame 5 are pivotally connected to each other midway of their ends by the pivot bolt 11, and the two side bars 9 and 10 are pivotally connected to each other by means of the pivot bolt 12. The side bars 9 and 10 are duplicates of the side bars 6 and 7, and the latter will be described in detail.

The side bar 6 is provided on its lower end with a ground wheel 13, which turns on the stud shaft 14, and the side bar 7 is adapted to engage the ground with its lower end, to provide a friction bearing with the ground. The upper end of the side bar 7 is provided with a lateral handle 7a. The side bar 10 is likewise provided with a lateral handle 10a, and the side bar 9 is provided with a ground wheel 15, connected thereto by the stud shaft 16, while the lower end of the side bar 10 is adapted to have frictional bearing engagement with the ground.

A fabric shopping bag 17 is disposed between the two side folding frames 5 and 8, and is supported by the hanger straps 18 and 19, which engage the side bars of the frames 5 and 8, and by the hanger or connecting straps 20 and 21, which also engage the side frames 5 and 8.

The side bars 6 and 7 of the frame 5 are adapted to fold on each other, and the side bars 9 and 10 of the frame 8 are also adapted to fold upon each other. In order that the frame 5 may be collapsed toward the frame 8, and at the same time collapse the fabric shopping bag, I provide a folding brace 22, consisting of the metal brace bars 23 and 24. The outer end of the brace bar 23 is pivoted to bar 6 and the outer end of the bar 24 is pivoted to the bar 7. The inner ends of the bars 23 and 24 are pivotally connected to each other by the rivet 25, and the bar 23 is formed with an L-shaped stop 26, which is engaged by the upper edge of the bar 23 and provides means for limiting the pivotal movement of the two bars on each other, so that when the two bars are pressed down, when they occupy the positions shown in Fig. 6, they will not move beyond the position shown in Fig. 1, when the stop 26 will engage the edge of the bar 23 and limit or prevent further movement, thereby holding the frames in open positions, as shown in Fig. 1. A similar folding brace connects the upper ends of the bars 9 and 10 of the frame 8.

The frame 5 is connected to the frame 8 by means of the upper folding braces 27 and 28, which are pivoted at their ends to the side bars of the two frames, and by means of the folding braces 29 and 30, which are pivoted at their ends to the upper and lower parts of the frames 5 and 8. Each of these folding braces is constructed with the stop joint shown in Figs. 5 and 6.

If desired the supporting frame bar 7 of the frame 5, and the supporting frame bar 10 of the frame 8, may be equipped with ground wheels.

It is shown that the side bars of each frame fold on each other, and that the frame on one side of the device will fold on the frame on the other side of the device, so that the shopping bag is collapsed between the two frames.

When the device is in collapsed condition it may be easily opened by pressing downwardly on the handles, and then pushing the central portions of the folding braces downwardly, thereby forcing the braces into locked open positions, to hold the side frames in open, extended, positions, with the shopping bag sustained in open condition, so that groceries or other goods purchased may be easily placed in the bag, or withdrawn.

Due to the construction shown it is possible for a housewife or other shopper to make a larger number of purchases and to take home the goods purchased, as the shopping cart will occupy a small volume and space when it is empty, and can be expanded to full capacity, without great effort, and will roll over the ground easily when fully or partially loaded. It is, however, so light when empty, that it may be easily carried into and out of automobiles, buses, trains and street cars.

It is understood that various changes in the construction of the parts, and their relation to each other, may be resorted to, within the scope of the invention, as defined in the claims, without departing from the invention.

Having described my invention I claim:

1. A collapsing shopping device, consisting of a pair of folding side frames, each frame consisting of side bars pivotally connected to each other midway of their ends, one side bar of each frame having a ground wheel and the other side bar having a lower end adapted to have frictional bearing engagement with the ground and provided with a handle on its upper end, folding braces connecting the side frames to each other, and a shopping receptacle supported on and between the two side frames.

2. A collapsing shopping device, consisting of a pair of folding side frames, each frame consisting of bars pivoted to move across each other, one of the bars of each frame having a lateral handle on its upper end, and the lower end of the other bar of the frame having a ground wheel, a fabric bag supported at its upper end between the frames and also supported at its lower end between the frames, folding braces connecting the bars of each frame to each other, and folding braces connecting the frames to each other at the upper and lower ends thereof, each folding brace having a stop to lock the brace in open extended position, so as to hold the shopping bag open.

3. A collapsible shopping cart, comprising a pair of side frames, each side frame consisting of bars pivotally connected to each other intermediate of their ends, one bar of each side frame having a wheel mounted to turn on the lower end thereof to engage the ground and the companion bar of each side frame being adapted to engage the ground, a fabric bag mounted on the bars of the side frame, a folding brace connected to the upper ends of the side bars of each side frame, a folding brace connecting one side bar of one side frame to a corresponding side bar of the other side frame, and a folding brace connecting the other side bar of one side frame to the corresponding side bar of the other side frame, each folding brace having a stop to limit its opening action.

MICHAEL GIORDANO.

REFERENCES CITED

The following references are of record in the file of this patent:

UNITED STATES PATENTS

| Number | Name | Date |
|---|---|---|
| 1,769,418 | Cooper et al. | July 1, 1930 |
| 914,104 | Binney | Mar. 2, 1909 |
| 1,234,797 | Parmenter | July 31, 1917 |